United States Patent [19]

Tauern et al.

[11] 3,996,446
[45] Dec. 7, 1976

[54] ATTACHMENT MEMBERS ARRANGED FOR WELD FASTENING TO A METALLIC BASE

[75] Inventors: Dankmar Tauern, Triesenberg; Rainer Wild, Schaan, both of Liechtenstein

[73] Assignee: Hilti Aktiengesellschaft, Schaan, Liechtenstein

[22] Filed: Aug. 19, 1974

[21] Appl. No.: 498,621

Related U.S. Application Data

[63] Continuation of Ser. No. 355,659, April 30, 1973, abandoned, which is a continuation of Ser. No. 109,466, Jan. 25, 1971, abandoned.

[52] U.S. Cl. ................................ 219/99
[51] Int. Cl.[2] .............................. B23K 9/20
[58] Field of Search .......... 24/73 HS, 259 C; 219/93, 98, 99

[56] References Cited
UNITED STATES PATENTS

| | | | |
|---|---|---|---|
| 1,020,056 | 3/1912 | Rietzel | 219/93 |
| 2,602,978 | 7/1952 | Clark | 24/259 C |
| 2,896,065 | 7/1959 | Murdock et al. | 219/99 |
| 2,936,981 | 5/1960 | Aversten | 219/99 X |
| 3,145,288 | 8/1964 | Woodling | 219/99 |
| 3,415,414 | 12/1968 | Gonzalez | 24/73 HS |
| 3,774,009 | 11/1973 | Hodges | 219/93 X |

*Primary Examiner*—J. V. Truhe
*Assistant Examiner*—N. D. Herkamp
*Attorney, Agent, or Firm*—Toren, McGeady and Stanger

[57] ABSTRACT

Small attachment members, such as clamps, mounting bars, identification plates, lugs and the like, are formed of shaped walls with at least one welding projection stamped from the wall arranged a contact the metallic base which projection limits the arc in condenser-discharge welding of the attachments and a punctiform projection centrally disposed on and extending outwardly from the welding projection is used for starting and controlling the condenser-discharge welding operation.

2 Claims, 4 Drawing Figures

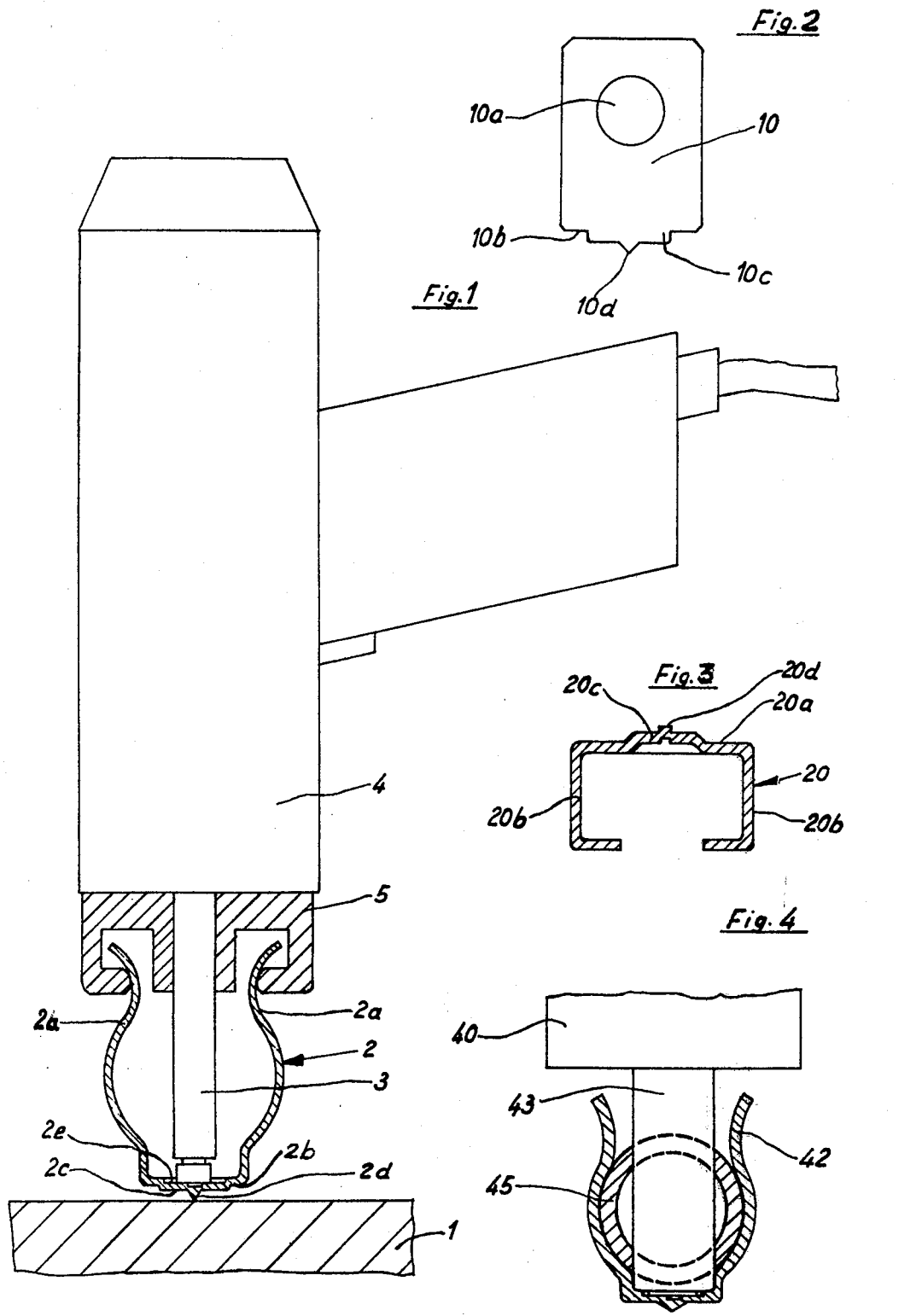

3,996,446

ATTACHMENT MEMBERS ARRANGED FOR WELD FASTENING TO A METALLIC BASE

This is a continuation of application Ser. No. 355,659, filed Apr. 30, 1973, which was a continuation of application Ser. No. 109,466, filed Jan. 25, 1971 both now abandoned.

SUMMARY OF THE INVENTION

The present invention is directed to small attachment members, such as clamps, mounting bars, indentification plates, lugs and the like, which are fastened by a welding arrangement to a metallic base, and, more particularly, it concerns stamped projections formed in the attachment member for facilitating the welding operation.

For fastening attachment members to a metallic base, it has been known to provide continuous bores in the attachment member and in the base and to secure the two together by means of a rivet or screw. Another manner of effecting the attachment has been to provide threaded bores in the base and to screw the attachment members into the bores. However, the production of bores and the riveting and screwing operations requires considerable time and, together with the attachment members, has led to high and uneconomical assembly costs.

In another known fastening method an anchoring member having a threaded shank is driven into the base by means of an explosive charge driven bolt setting device and the attachment member is secured on the threaded shank by means of a nut. Alternatively, a stud can be driven through the attachment member into the base so that the stud secures the member directly to the base. This type of fastening is disadvantageous in certain instances, for example, where sealing problems develop after a stud or anchoring member is driven into the base or where the base is formed of a thin plate or similar material which is too weak for this type of fastening operation. Moreover, in such fastening operations, the assembly costs are uneconomical in view of the type of fastening required. Still another known method of securing attachment members to a base consists in welding a threaded or rivet pin onto the base and then securing the attachment member onto the pin. In this type of fastening operation, a long assembly time is involved, particularly for attaching the nut or closing head on the pin, and, as a result, also leads to high assembly costs.

Accordingly, it is the primary object of the present invention to provide small attachment members for fastening to a metallic base where the above-mentioned disadvantages are avoided and where the fastening operation can be carried out rapidly and economically.

Therefore, in accordance with the present invention, the attachment members are provided with one or more stamped welding projections which extend from the surface of the member which contacts the base in the assembled position. The stamped projections limit the arc in condenser-discharge welding of the attachment members to the metallic base.

Since the attachment members have one or more projections which are suitable for limiting the arc in condenser-discharge welding, it is possible to fix the attachment members directly to the base within a few seconds, that is, without the interposition of an additional fastening or anchoring element.

Preferably, the projections formed on the attachment members for assisting in the welding operation are provided with additional stamped punctiform projections which aid in starting and controlling the condenser-discharge welding operation.

During the welding operation, the attachment members are held in position and biased against the metallic base by a holding element which forms a part of the welding apparatus. If it is preferred, the holding member is formed of a conductive material.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

In the Drawing:

FIG. 1 is a view, partly in cross-section, of an attachment member, formed in accordance with the present invention, and positioned for weld attachment to a base member;

FIG. 2 is a view through a welding lug formed in accordance with the present invention;

FIG. 3 is a cross-sectional view of a mounting bar formed in accordance with the present invention; and FIG. 4 is a view, partly in cross-section, illustrating another embodiment of the invention.

DETAILED DESCRIPTION OF THE INVENTION

In FIG. 1, a clamp 2 is positioned for attachment to a metallic base member 1 in a condenser-discharge welding operation. The clamp is formed by a pair of sides 2a joined by a connecting web 2b. In the connecting web a centrally disposed welding projection 2c is stamped so that the projection extends outwardly from the web toward the base member to which the clamp is to be attached. At the center of the welding projection 2c, an outwardly directed punctiform projection 2d is formed. In fastening the clamp to the base member 1, an electrode 3 mounted in a welding gun 4 of a condenser-discharge welding apparatus, not shown, contacts the inner face 2e of the welding projection 2c. During the welding operation, the clamp 2 is secured in position by a holding element 5 disposed about the electrode 3 on the forward end of the welding gun 4. The holding element 5 is shaped to receive the free ends of the sides 2a of the clamp and to hold the clamp in position against the base member 1. The holding element 5 is preferably made of rubber. In FIG. 4, another holding element 45 is shown, which is within the interior of the clamp 42 and is positioned about the electrode 43. As distinguished from the holding element 5, the holding element 45 is made of a conductive material, such as brass, so that in the arrangement shown in FIG. 4, both the electrode and the holding element are conductive. In the welding operation, the base member 1 in the region of the welding projection 2c, is melted by a current impulse provided from the welding gun, and, in addition, the welding projection 2c is also melted after the punctiform projection 2d has been melted away and the clamp is pressed into the melted area by the welding gun so that the base member 1 and the clamp 2 are integrally attached after the melted materials have solidified.

In FIG. 2, a lug 10 embodies another form of attachment member. The lug 10 has a bore 10a formed in its surface and on one of its end faces 10b a centrally disposed welding projection 10c is provided, which, in turn, has a punctiform projection 10d centrally arranged on the welding projection. In the clamp 2 shown in FIG. 1, and the lug 10 shown on FIG. 2, the welding projection extending outwardly from the clamp or lug, limits the arc during the condenser-discharge welding operation, and the punctiform projection 2d, 10d assists in starting and controlling the welding procedure.

In FIG. 3, the attachment member is provided by a mounting bar 20, which, after it is secured to the base member, can be used for supporting cable straps, tube supports and the like. The mounting bar 20 is formed of a pair of sides 20b joined at one end of a connecting web 20a. Centrally disposed on the connecting web is a welding projection 20c extending outwardly from the mounting bar and a punctiform projection 20d is positioned centrally on the welding projection and extends outwardly for contacting the surface to which the mounting bar is to be attached. As in the other attachment members described above, the punctiform projection 20d assists in starting and controlling the welding operation while the welding projection 20c limits the arc during the welding operation. If it is desired to secure the mounting bar to the base member at a number of spaced locations, the welding projections 20c and punctiform projections 20d can be arranged in equally spaced intervals along the longitudinal direction of the mounting bar.

While several attachment members have been illustrated in the drawing for purposes of describing the invention, it will be appreciated that many different attachment members can be provided having the requisite welding projection and punctiform projection for fastening the attachment member in a condenser-discharge welding operation.

What is claimed is:

1. A method of securing a planar surface web of a metallic attachment member having a first projection with an areal surface extending outwardly from the planar surface of the web and a second projection approximately centered on said first projection and extending outwardly from the projection away from the web with the outer surface of said second projection terminating in a surface considerably smaller in area than that of the first projection, the steps comprising positioning and biasing the outer surface of the second projection into contact with the base to which the attachment member is to be secured, positioning a welding electrode of a condensor-discharge welding apparatus in contact with the opposite surface of the web from the side from which the projections extend and in alignment with the second projection, and applying a current impulse for melting the base in the region of its contact with the second projection and in its region juxtaposed to the first projection and also for melting the second projection and first projection for welding the areal surface of the first projection of the attachment member to the base.

2. A method of securing a planar surface web of a metallic attachment member having a first projection with an areal surface extending outwardly from the planar surface of the web and a second projection approximately centered on the first projection and extending outwardly from the first projection away from the web with the outer surface of said second projection terminating in a punctiform surface, the steps comprising positioning and biasing the punctiform surface of the second projection into contact with the base to which the attachment member is to be secured, positioning a welding electrode of a condensor-discharge welding apparatus in contact with the opposite surface of the web from the side from which the projections extend and in alignment with the punctiform surface of the second projection, and applying a current impulse from the welding apparatus for melting the base in the region of its contact with the second projection and in its region juxtaposed to the first projection and also for melting the second projection and the first projection for welding the areal surface of the first projection of the attachment member to the base.

* * * * *